United States Patent [19]
De Poorter et al.

[11] 4,080,273
[45] Mar. 21, 1978

[54] METHOD FOR PHOTOCHEMICAL REDUCTION OF URANYL NITRATE BY TRI-N-BUTYL PHOSPHATE AND APPLICATION OF THIS METHOD TO NUCLEAR FUEL REPROCESSING

[75] Inventors: Gerald L. De Poorter; Cheryl K. Rofer-De Poorter, both of Los Alamos, N. Mex.

[73] Assignee: The United States of America as represented by the United States Department of Energy, Washington, D.C.

[21] Appl. No.: 720,872

[22] Filed: Sep. 7, 1976

[51] Int. Cl.$^2$ .......................... B01J 1/10; B01D 11/04
[52] U.S. Cl. ................................. 204/157.1 R; 423/10
[58] Field of Search ..................... 423/10; 204/157.1 R

[56]  References Cited
U.S. PATENT DOCUMENTS

| 3,120,479 | 2/1964 | Dols et al. | 204/157.1 R |
| 3,276,850 | 10/1966 | Rainey | 423/10 |
| 3,620,687 | 11/1971 | Wilson | 423/10 |

OTHER PUBLICATIONS

Schlea et al., "Uranium (IV) Nitrate as a Reducing Agent for platonium (IV) in the Purex Process". Report #DP-808, 1963.
Carroll, J. C. et al., "The Photoactivated Reduction of Uranium (VI) to Uranium (IV) Nitrates" AEC Report #HW-70543 (1961).
Minc et al. "the Influence of Light on the Absorption Spactra of Uranyl Nitrate in Tributylphosphite." In *Nukleonika*, vol. 5 pp. 33–45, 1960.
Brzeski, J. "The Influence of Oxygen on the Photosensitivity of Uranyl Nitrate Solutions in Tri—N—butyl-phosphate." Nukleonika, vol. 6, pp. 649–658, (1961).
Kertes, A. S. et al., J. Inorg. Nucl. Chem. vol. 19, pp. 359–362, 1961.
Karlova et al., "Shipt of Chemical Equilibrium of Solutions by Resonant IR Laser Radiation," In *JETP Letters*, vol. 22 pp. 222–223, (1975).

*Primary Examiner*—Richard E. Schafer
*Attorney, Agent, or Firm*—Dean E. Carlson; Edward C. Walterscheid

[57]  ABSTRACT

Uranyl ion in solution in tri-n-butyl phosphate is readily photochemically reduced to U(IV). The product U(IV) may effectively be used in the Purex process for treating spent nuclear fuels to reduce Pu(IV) to Pu(III). The Pu(III) is readily separated from uranium in solution in the tri-n-butyl phosphate by an aqueous strip.

12 Claims, 5 Drawing Figures

METHOD FOR PHOTOCHEMICAL REDUCTION OF URANYL NITRATE BY TRI-N-BUTYL PHOSPHATE AND APPLICATION OF THIS METHOD TO NUCLEAR FUEL REPROCESSING

BACKGROUND OF THE INVENTION

The invention described herein relates to a method for photochemically reducing uranyl ion in solution in tri-n-butyl phosphate, and more particularly to an improvement in the Purex process for treating irradiated nuclear fuels to recover uranium and plutonium values therein wherein the U(IV) produced by the photochemical reaction of uranyl nitrate with tri-n-butyl phosphate reduces the plutonium partitioned in the tri-n-butyl phosphate from Pu(IV) to Pu(III).

The Purex process for the treatment of irradiated, spent nuclear fuels to recover uranium and plutonium values therefrom has been in large scale use for over 20 years and is currently employed, with minor variations, by most of the nuclear fuel reprocessing plants now operating throughout the world. It is based on solvent extraction, i.e., the partitioning of a solute between two immiscible liquids. Tri-n-butyl phosphate (TBP) extracts uranium in the +6 oxidation state as the uranyl ($UO_2^{2+}$) ion and plutonium in the +4 oxidation state from aqueous solution, while extracting the other components of spent nuclear fuel to a much lesser degree. Plutonium in the +3 oxidation state is more soluble in the aqueous phase so that the plutonium in the TBP may be selectively partitioned into an aqueous stream by reducing the Pu(IV) to Pu(III). In practice, approximately a 30% solution of TBP in a suitable diluent, e.g., kerosene or normal dodecane, is used as the organic phase. By the addition of appropriate oxidizers, reducers, and salting-out reagents, the uranium and plutonium can be removed from the dissolved fuel elements and separated from each other.

The prior art teaches that a suitable agent for reducing the plutonium from the +4 to the +3 oxidation state is ferrous sulfamate, $Fe(SO_3NH_2)_2$, which is effective because Fe(II) rapidly reduces Pu(IV) to Pu(III) and because the sulfamate ion stabilizes Pu(III). But ferrous sulfamate has the disadvantage of introducing nonvolatile constituents, i.e., sulfur and iron, into the process wastes. These constituents increase the volume of radioactive wastes to be stored and may accelerate the corrosion of evaporators.

An alternative approach is the use of U(IV) as the reductant for the Pu(IV). It is known that the ferrous sulfamate can readily be replaced with uranium(IV) nitrate or uranium sulfate. See, e.g., Schlea et al., "Uranium(IV) Nitrate as a Reducing Agent for Plutonium(IV) in the Purex Process," E. I. du Pont de Nemours & Company Savannah River Laboratory report DP-808 (1963). The addition of these salts, however, also increases the volume of the waste and has the added disadvantage of altering the isotopic ratio of the uranium that is recovered.

To avoid these problems, electrolytic reduction of the Pu(IV) is used in a rather recent variation of the Purex process. This approach, however, requires the use of a special partitioning column containing the necessary electrodes. It will be readily apparent that in the event of a malfunction, repair of the column is not easily achieved because of the contamination produced by the uranium and plutonium.

A simpler approach is to use photolysis for the reduction of uranyl ion by organic reductants. See, e.g., J. C. Carroll et al., "The Photochemical Reduction of Uranium(VI) to Uranium(IV) Nitrate," Hanford Atomic Products Operation report HW-70543(1961). While such reduction is known to occur in the presence of a variety of organic reagents, the literature appears contradictory as to whether it has in fact been shown to occur with TBP used as the reductant. Thus, Kertes et al. expressly state that in nitric acid systems with either the neutral or acidic butyl esters of phosphoric acid, no photosensitized reduction of U(VI) takes place. See J. Inorg. Nucl. Chem., vol. 19, pp 359–362 (1961). But Minc et al. infer that in the presence of ultraviolet radiation, TBP reduces U(VI) in uranyl nitrate to U(V) and that this in turn undergoes a disproportionation reaction resulting in the formation of U(IV) and U(VI). See Nukleonika, vol. 5, pp. 33–45 (1960). Brzeski teaches that in the presence of strong ultraviolet radiation and the absence of oxygen, uranyl nitrate in solution in TBP is reduced to U(IV). He further indicates that such reduction does not occur with light in the visible spectrum. See Nukleonika, vol. 6, pp. 649–658 (1961).

SUMMARY OF THE INVENTION

We have now found that uranyl ion in solution in TBP is readily reduced to U(IV) by irradiating the solution with visible light in the spectral range of 350 nm to 520 nm. The U(IV) thus produced can readily be used as a reductant for Pu(IV) to Pu(III) in the Purex process for treating irradiated, spent nuclear fuel elements to separate the fission products, uranium, and plutonium contained therein. The acidity of the feed solution affects the amount of U(IV) produced, with best results obtained with feed solutions about 1.0 M in $HNO_3$; however, the reduction readily occurs at higher acid concentrations, reaching a minimum at about 4.0 M $HNO_3$ content and staying constant at this minimum at still higher acid concentrations.

In one embodiment of the invention as applied in the Purex process, a TBP solution of uranyl ion and Pu(IV) partitioned from the aqueous feed solution is irradiated directly with visible light in a preferred wavelength range. In another embodiment, a TBP solution of uranyl ion obtained in accordance with the Purex process is irradiated with visible light in a preferred wavelength range and the product U(IV) in solution in TBP is added to the Purex stage in which the TBP solution contains both uranyl ion and Pu(IV). A preferred wavelength of the irradiating light is one at which the photolytic production of $NO_2^-$ from $NO_3^-$ and its subsequent interaction with the product U(IV) is minimized.

THE PUREX PROCESS

Figure 1:
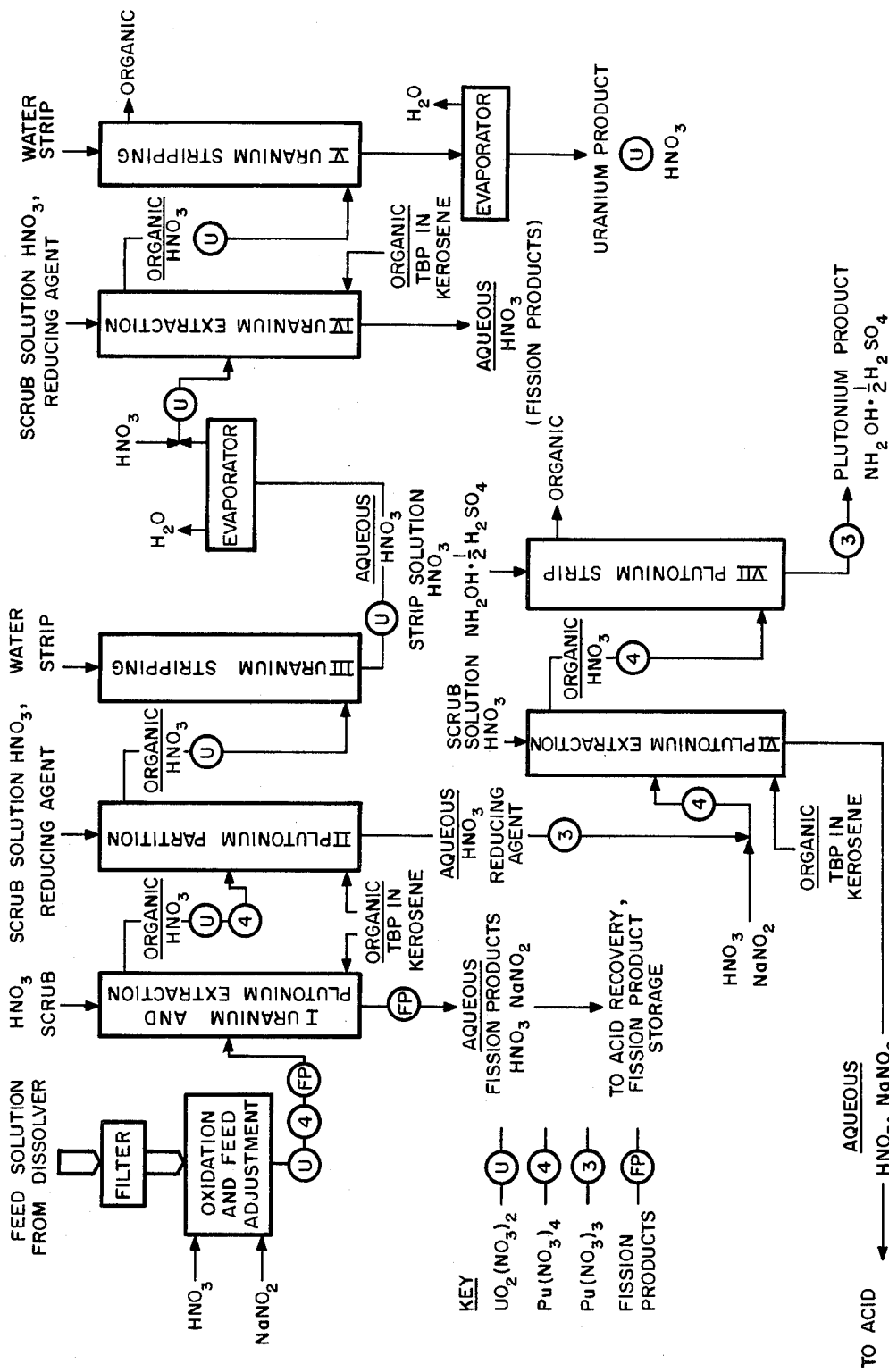
FIG. 1 is a simplified flow chart of the Purex process as taught in the prior art.

FIG. 1 is a simplified flow chart of the Purex process as taught in the prior art. The fuel elements are first chopped into small pieces and then treated with concentrated nitric acid. The metallic cladding does not dissolve and is mechanically removed. Before the extraction of uranium and plutonium (Stage I), $NaNO_2$ is added to the feed solution to ensure that the plutonium is in the +4 oxidation state. In Stage I most of the uranium and plutonium are separated from most of the other actinides and fission products. The uranium and plutonium are separated from each other (Stage II) by reducing the plutonium to the +3 oxidation state and extracting it into an aqueous strip. This separation is not complete, and a small amount of plutonium is carried on to Stages III and IV. In Stage III, the uranium and traces of plutonium and fission products are stripped from the TBP into water, which is then evaporated to the desired concentration and the acidity adjusted. The uranium is next separated from the remaining plutonium and fission products by reduction of the plutonium to the +3 oxidation state and extraction of the uranyl ion into TBP. The uranium is again stripped from the TBP (Stage V) and purified by ion exchange to $UO_2(NO_3)_2$ product. The aqueous stream from Stage II contains most of the plutonium and a trace of the fission products. The plutonium is reoxidized to the +4 state and extracted into TBP (Stage VI), after which it is again reduced to $Pu^{3+}$, stripped from the TBP, and purified by ion exchange to the $Pu(NO_3)_3$ product.

DESCRIPTION OF THE PREFERRED EMBODIMENT

Measured portions of TBP and an aqueous solution of uranyl nitrate and nitric acid were placed in a separatory funnel and shaken. The aqueous layer was drawn off, and the organic layer was centrifuged to complete the separation of the phases. The organic layer was then exposed to light from a high-pressure xenon lamp (Oriel, 150 W), either unfiltered or filtered through a Corning glass filter (filters 0-52, 3-74, and 7-60). Uranyl and U(IV) concentrations were measured spectrophotometrically in a Beckman Acta MIV UV-Vis spectrophotometer. Spectra of the starting solution and the photolyzed solution were recorded from 850 to 300 nm. Calibration curves were determined for the concentration of $UO_2^{2+}$ in water and TBP. Uranium(IV) concentrations were also determined colorimetrically.

Figure 2:
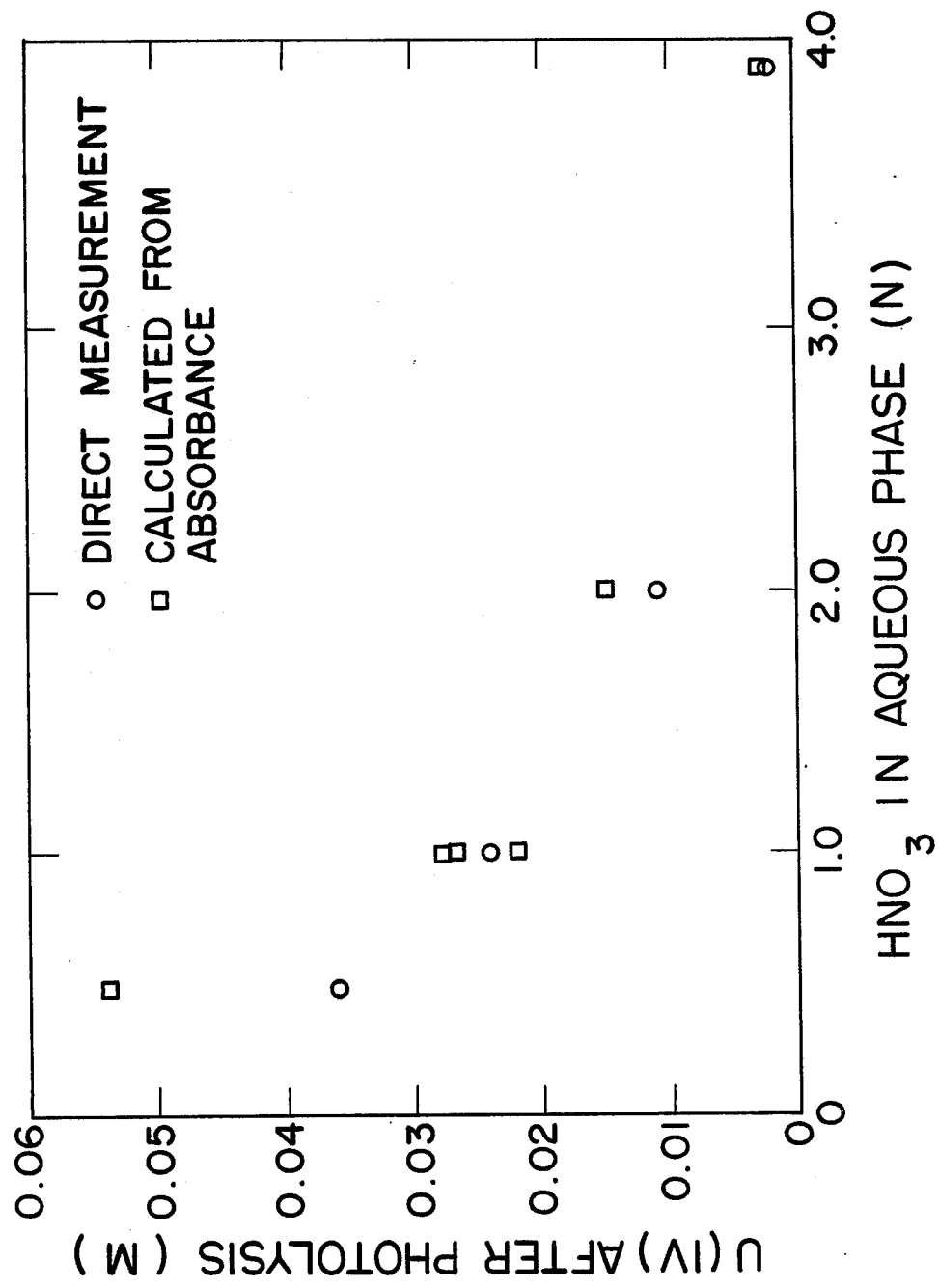
FIG. 2 shows U(IV) yield as a function of $HNO_3$ concentration in the initial aqueous phase.

The photolytic yield of U(IV) as a function of $HNO_3$ concentration in the aqueous phase before extraction is shown in FIG. 2. The points labeled "direct measurement" were obtained by colorimetric analysis for U(IV). The points labeled "calculated from absorbance" were obtained by measuring the absorbance at the U(IV) maximum near 650 nm and calculating the concentration from a calibration curve for the appropriate $HNO_3$ concentration obtained by analyzing photolyzed solutions by the colorimetric method. For nitric acid concentrations of 1.0 M and higher, the U(IV) formed remains in solution. For 0.5 M nitric acid and solutions in which no acid was added, a precipitate is formed. Because of this precipitate, it was not possible to determine the total amount of U(IV) formed for those solutions, and erratic analyses were obtained for the U(IV) remaining in solution (see FIG. 2). Above 1.0 M, increasing acid concentration results in a decreasing yield of U(IV) to a minimum at 4.0 M, which remains the same for higher acid concentrations. The reduction does not take place in an aqueous solution of $UO_2(NO_3)_2$ with a small amount of TBP present. Deoxygenation of the solutions by bubbling $N_2$ through them gives the highest yields of U(IV). However, static solutions, i.e., those which have not been deoxygenated, are also readily photolyzed, although with lesser yields of U(IV).

Figure 3:
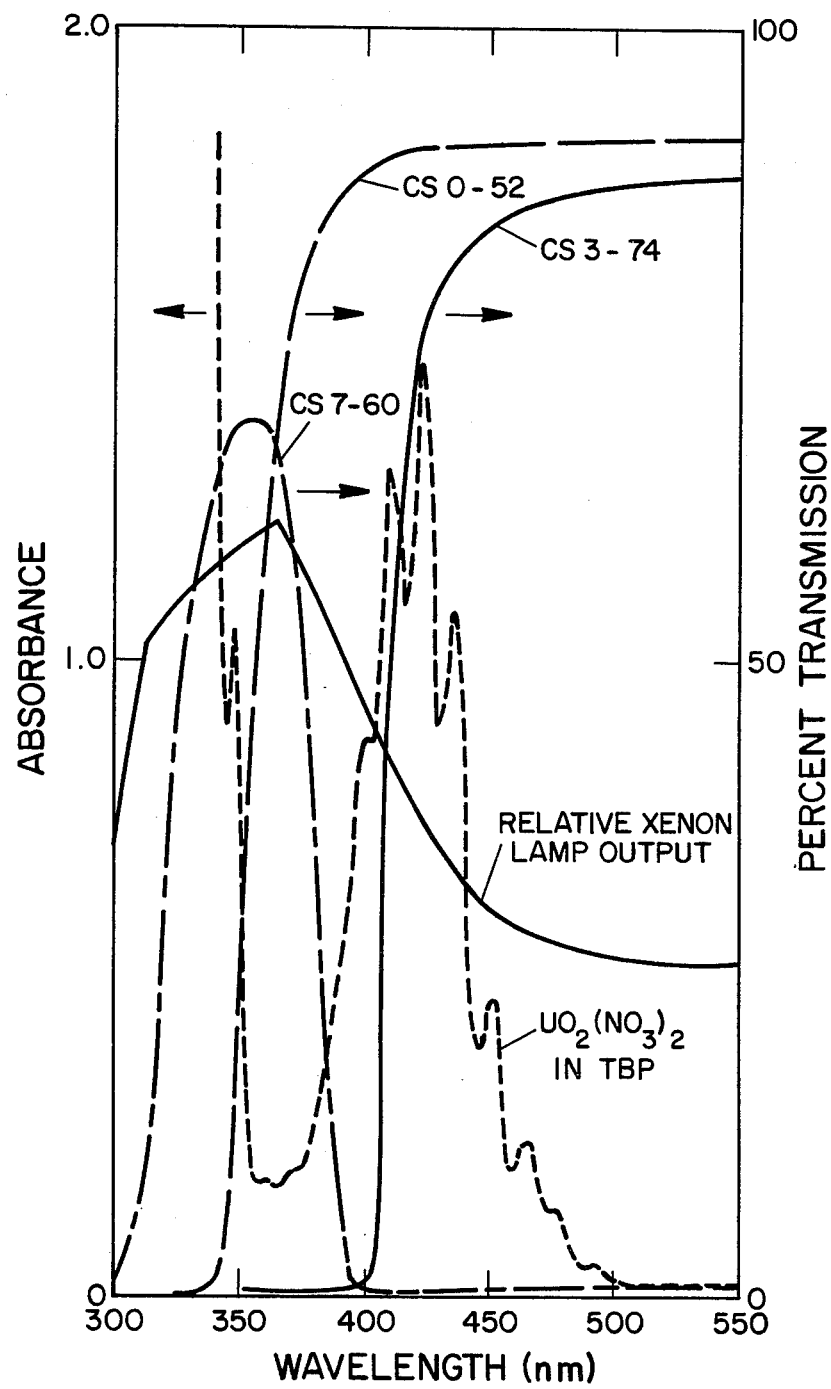
FIG. 3 is a compilation of the spectra of the xenon lamp output, transmission of the glass filters used, and $UO_2(NO_3)_2$ in TBP.

The light from the xenon lamp was filtered to allow photolysis at wavelengths less than 400 nm, greater than 350 nm, and greater than 400 nm. The lamp output was greatest at the higher energies. FIG. 3 summarizes the spectrum of the lamp and the transmission of the three filters, with the spectrum of $UO_2(NO_3)_2$ in TBP for comparison. The Table gives results of typical experiments with and without the filters.

Table

| $HNO_3$ Concn. (N) | $A_{max}$ |  |  |  |
|---|---|---|---|---|
|  | No Filter | 7-60 | 0-52 | 3-74 |
| 0[a] | 0.428 | 0.129 | 0.340 | 0.410 |
| 1.0[b] | 1.095 | 0.245 | 0.943 | 0.598 |
| 3.0[b] | 0.230 | 0.053 | 0.494 | 0.325 |

[a]$A_{max}$ measured at 635 nm
[b]$A_{max}$ measured at 654 nm

Infrared spectra of the products indicate that butanol and butyraldehyde are probably present in the products. Nitrite was detected in all of the photolyzed solutions by the Griess test. The U(IV) reoxidizes upon standing in the TBP solutions, more rapidly in the more acid solutions. The solutions of lower acidity retained U(IV) for days. The solutions were stored in clear glass stoppered bottles, exposed to air and ambient light conditions in the laboratory.

The photolysis was also carried out in a 30% TBP solution in normal dodecane. Extraction from a 0.1 M $UO_2(NO_3)_2$, 1.0 M $HNO_3$ solution followed by photolysis gave increasing amounts of U(IV) for the first four hours. The U(IV) then decreased under further illumination. Nitrite was observed. Extraction from a 1.5 M $UO_2(NO_3)_2$, 1.0 M $HNO_3$ solution followed by photolysis gave a reddish-brown solution with a UV-Vis spectrum indicating the presence of U(V). Nitrite was produced in the early part of this photolysis, but after six hours irradiation, none could be detected. The product UV-Vis spectrum in both cases reverted to the $UO_2^{2+}$ spectrum after two to three days.

Figure 4:
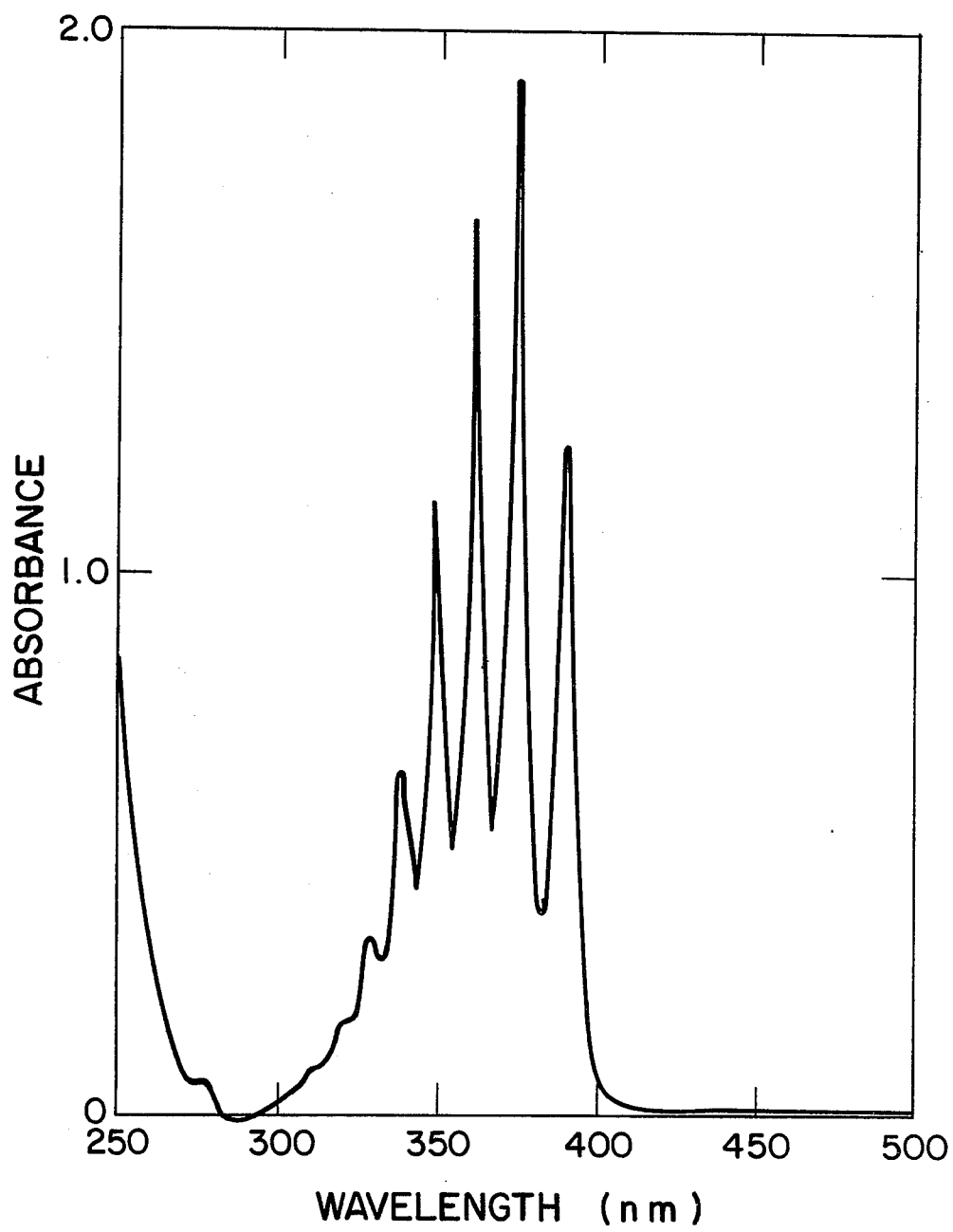
FIG. 4 is a spectrum of TBP extract from 0.025 M $NaNO_2$ with 0.01 N $HNO_3$ in water.
Figure 5:
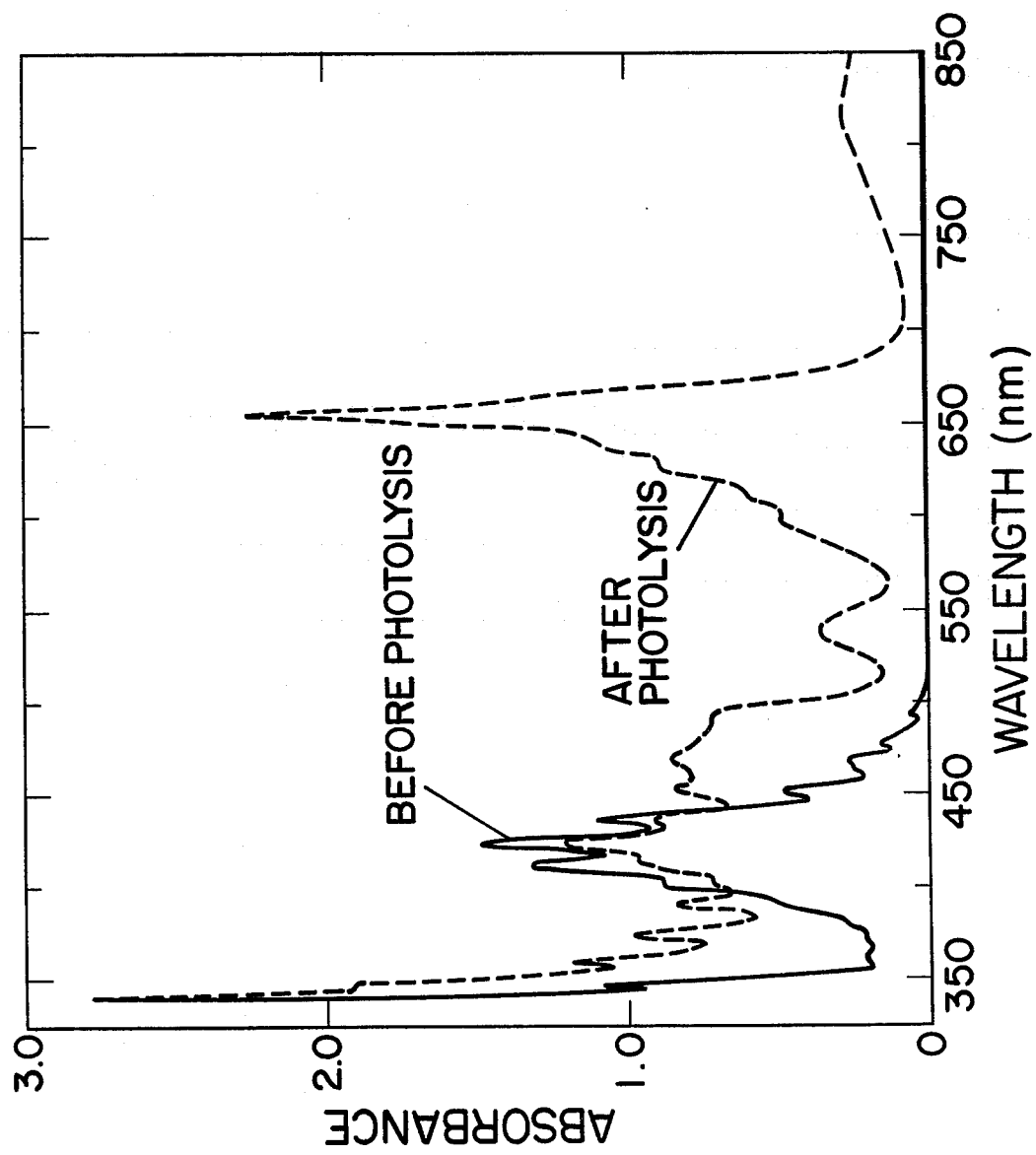
FIG. 5 shows spectra of a TBP solution of uranyl ion before and after photolysis in accordance with the invention.

A solution of $HNO_3$ in TBP was prepared by extraction from an aqueous solution and photolyzed for 6 hours. A control solution was kept in the dark for the same amount of time. $HNO_2$ was formed by photolysis, but not in the dark. A UV-Vis spectrum showed a series of sharp peaks beginning at 400 nm. Tri-n-butyl phosphate extraction of a $NaNO_2$ solution showed a similar series of peaks. Spectra of TBP solutions prepared by extraction of an acidic aqueous $NaNO_2$ solution (0.025 M $NaNO_2$, 0.01 N $HNO_3$) is shown in FIG. 4. Peaks are also observed at these positions in the UV-Vis spectra of the photolyzed $UO_2(NO_3)_2$-TBP solutions. FIG. 5 gives the spectra of a typical solution before and after photolysis.

From the foregoing, it is apparent that reduction of $UO_2(NO_3)_2$ takes place readily under the influence of light in TBP at various $HNO_3$ concentrations. Nitric acid is also reduced to $HNO_2$, and hydrolyzed and oxidized products of TBP are formed. Reoxidation of the U(IV) formed by the uranyl reduction also takes place. Such reoxidation presumably occurs primarily by reaction with $NO_2^-$. This in turn appears to account for the decreasing U(IV) yield with increasing $HNO_3$ concentration.

The wavelength dependence of the photolytic reduction of uranyl to U(IV) in the presence of TBP is shown by the data of the Table. Although the output of the lamp is much more intense at wavelengths below 400 nm, the photochemical yield is much less at the lower wavelengths than for irradiation above 400 nm. In fact, for solutions containing 3.0 N $HNO_3$, more U(IV) is produced with filtered lamp output than with unfiltered light. Nitrite production, from examination of the UV-Vis spectra, seems to be similar with and without filters, although it varies with acid concentration.

The exact mechanism by which the U(IV) is produced is not known. However, the electronic transition (or transitions) in the uranyl ion between 520 and 350 nm seems to be responsible for the photochemical reaction. The reaction resulting from the more intense, higher-energy transitions may come about through relaxation to the lower-energy, chemically reactive state (or states). In addition, reoxidation of the U(IV) takes place with $NO_2^-$, which absorbs at wavelengths less than 400 nm, and perhaps $NO_3^-$, which absorbs at wavelengths shorter than 350 nm. Elimination or at least a lessening of this reaction accounts for the greater yields from filtered light.

The participation of $NO_3^-$ or $NO_2^-$ in the reduction of $UO_2^{2+}$ is not entirely clear, but there is evidence for photochemical oxidation of the product U(IV) by one or both. The action of $NO_2^-$ and $NO_3^-$ in oxidizing U(IV) is taught in the art. Because the production of $NO_2^-$ or its interaction with U(IV) is affected by the wavelength of the irradiating light, it is preferable that the photolysis of the $UO_2^{2+}$ takes place with light of a wavelength at which this interaction is minimized.

The overall reaction is sensitive to changes in concentration of the reagents, but no conditions have been found under which no photochemical reaction took place. At high $UO_2(NO_3)_2$ loadings of the TBP, reduction to U(V) rather than to U(IV) takes place, albeit with little or no nitrite production.

Photolytic reduction of $UO_2^{2+}$ to U(IV) may advantageously be employed in the Purex process as a means of reducing Pu(IV) to Pu(III) and thereby facilitating the separation of plutonium from uranium in accordance with the process. As taught in the prior art, U(IV) reduces Pu(IV) to Pu(III). The U(IV) produced by the photolytic reduction of $UO_2^{2+}$ is stable for periods ranging from hours to days, depending on the nitric acid concentration. This permits considerable leeway as to the stage of the Purex process at which the irradiation is performed. Thus, for example, the irradiation may occur between Stages I and II of FIG. 1. In this instance it will be apparent that no reducing agent need be added to Stage II since the U(IV) formed as a result of the photolysis will effectively act as a reducing agent for the plutonium.

Alternatively, the irradiation may occur between Stages IV and V. The U(IV) thereby produced may be removed from Stage V and fed into Stage II as the reducing agent. The amount of the U(IV) necessary to effectively act as the reducing agent can be fed continuously from Stage V or can be temporarily stored and fed into Stage II as required. Typically, the amount of U(IV) required is three to five times the amount of Pu(IV) present in Stage II.

Regardless of at what stage the irradiation occurs, the process of the invention has the following advantages as applied to the Purex process. Visible light from commercially available lamps may be used to produce the photochemical reaction. This in turn means that readily available glass windows may be used for irradiation of the feed solution. The products of reaction are the same as those resulting from radioactive degradation of the feed solution and can be handled by normal solvent cleanup procedures for the Purex process. Finally, no reagents need be added, so that the bulk of waste in the Purex process is reduced.

What we claim is:

1. A method of reducing uranyl ion to U(IV) which consists of contacting tri-n-butyl phosphate with an aqueous solution of uranyl nitrate for a time sufficient for the uranyl ion to partition between said aqueous solution and said tri-n-butyl phosphate, and irradiating the resultant solution of uranyl ion in tri-n-butyl phosphate with light in the spectral range of 350 nm to 520 nm.

2. The method of claim 1 wherein said aqueous solution contains about 1 to about 4 M $HNO_3$.

3. The method of claim 2 wherein said aqueous solution contains about 1 M $HNO_3$.

4. The method of claim 2 wherein said solution of uranyl ion in tri-n-butyl phosphate is irradiated with light in the spectral range at which the interaction of said U(IV) with $NO_2^-$ is minimized.

5. The method of claim 4 wherein said light is in the spectral range of 400 nm to 520 nm.

6. The method of claim 5 wherein said light has a wavelength of about 414 nm.

7. The method of claim 5 wherein said solution is in equilibrium with air.

8. In a method for treating irradiated nuclear fuel elements to separate the fission products, uranium, and plutonium contained therein which comprises (a) dissolving said fuel elements in nitric acid to produce a feed solution of fission product nitrates, $UO_2(NO_3)_2$, and $Pu(NO_3)_4$, (b) contacting said feed solution with tri-n-butyl phosphate for a time sufficient for substantially all the uranium and plutonium contained therein to partition into said tri-n-butyl phosphate, (c) reducing said plutonium in said tri-n-butyl phosphate to Pu(III) and contacting said tri-n-butyl phosphate containing said Pu(III) with an aqueous phase for a time sufficient for said Pu(III) to partition into said aqueous phase, the improvement consisting of irradiating uranyl ion in solution in tri-n-butyl phosphate with light of a wavelength which reduces said uranyl ion to U(IV) and contacting said U(IV) with the Pu(IV) in solution in said tri-n-butyl phosphate to reduce said Pu(IV) to Pu(III).

9. The method of claim 8 wherein said light is light in the spectral range of 400 nm to 520 nm.

10. The method of claim 9 wherein said light is in the spectral range at which the interaction of said U(IV) with $NO_2^-$ is minimized.

11. The method of claim 9 wherein said feed solution is about 1.0 to about 4.0 M in $HNO_3$.

12. The method of claim 8 wherein said tri-n-butyl phosphate solution containing uranyl ion and Pu(IV) is irradiated with said light.

* * * * *